United States Patent
Daniels et al.

(10) Patent No.: US 9,302,657 B2
(45) Date of Patent: Apr. 5, 2016

(54) METHOD FOR OPERATING A HYDRAULIC BRAKE SYSTEM

(71) Applicants: FORD GLOBAL TECHNOLOGIES, LLC, Dearborn, MI (US); Robert Bosch GmbH, Stuttgart (DE)

(72) Inventors: Rudolf Daniels, Wermelskirchen (DE); Ian Moore, Pulheim (DE); Thomas Svensson, Leichlingen (DE); Joerg Riethmueller, Heilbronn (DE); Herbert Vollert, Vaihingen/Enz (DE); Timo Jahnz, Besigheim (DE)

(73) Assignees: Ford Global Technologies, LLC, Dearborn, MI (US); Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/370,157

(22) PCT Filed: Dec. 21, 2012

(86) PCT No.: PCT/EP2012/076612
§ 371 (c)(1),
(2) Date: Jul. 1, 2014

(87) PCT Pub. No.: WO2013/102585
PCT Pub. Date: Jul. 11, 2013

(65) Prior Publication Data
US 2014/0375114 A1   Dec. 25, 2014

(30) Foreign Application Priority Data

Jan. 2, 2012 (DE) .......... 10 2012 200 008

(51) Int. Cl.
*B60T 8/17* (2006.01)
*B60T 8/32* (2006.01)
(Continued)

(52) U.S. Cl.
CPC . *B60T 8/17* (2013.01); *B60T 8/176* (2013.01); *B60T 8/1755* (2013.01); *B60T 8/3275* (2013.01);
(Continued)

(58) Field of Classification Search
CPC ............... B60T 8/17; B60T 8/34; B60T 8/40; B60T 8/404; B60T 8/4045; B60T 8/1755; B60T 8/17558; B60T 8/176; B60T 2201/12; B60T 2201/122
See application file for complete search history.

(56) References Cited

U.S. PATENT DOCUMENTS 5,445,444 A * 8/1995 Rump et al. .................. 303/125
5,797,663 A * 8/1998 Kawaguchi et al. .......... 303/146
(Continued)

FOREIGN PATENT DOCUMENTS

DE  102005024577 A1  11/2006
DE  102006007731 A1  8/2007
(Continued)

OTHER PUBLICATIONS

German Patent and Trademark Office, International Search Report for corresponding PCT Application No. PCT/EP2012/076612 mailed Jun. 18, 2013.
(Continued)

*Primary Examiner* — Thomas J Williams
(74) *Attorney, Agent, or Firm* — Frank A. MacKenzie; Brooks Kushman P.C.

(57) ABSTRACT

A method for operating a motor vehicle hydraulic braking system having at least one electric motor-operated braking pressure generator. The output power of the electric motor-operated braking pressure generator is restricted during normal driving/braking situations and the restriction is temporarily deactivated upon identification of a critical driving situation, such as an overstressing of the brake system to include brake fade.

13 Claims, 1 Drawing Sheet

(51) Int. Cl.
*B60T 8/40* (2006.01)
*B60T 13/74* (2006.01)
*B60T 8/1755* (2006.01)
*B60T 8/176* (2006.01)
*B60T 8/34* (2006.01)

(52) U.S. Cl.
CPC . *B60T 8/34* (2013.01); *B60T 8/404* (2013.01); *B60T 13/745* (2013.01); *B60T 2201/12* (2013.01)

(56) References Cited

U.S. PATENT DOCUMENTS

| | | | |
|---|---|---|---|
| 5,924,508 A * | 7/1999 | Clauss et al. | 180/179 |
| 6,199,670 B1 * | 3/2001 | Shirai et al. | 188/158 |
| 6,499,813 B1 | 12/2002 | Wandel | |
| 7,568,773 B2 | 8/2009 | Nomura et al. | |
| 8,630,780 B2 | 1/2014 | Bunk et al. | |
| 2002/0030404 A1 * | 3/2002 | Nitta et al. | 303/122.12 |
| 2014/0200784 A1 * | 7/2014 | Nohira et al. | 701/70 |

FOREIGN PATENT DOCUMENTS

DE 102007030441 A1 1/2009
WO 0214130 A1 2/2002

OTHER PUBLICATIONS

German Patent and Trademark Office, Translation for the Search Report for corresponding PCT/EP2012/076612 mailed Jun. 18, 2013.

* cited by examiner

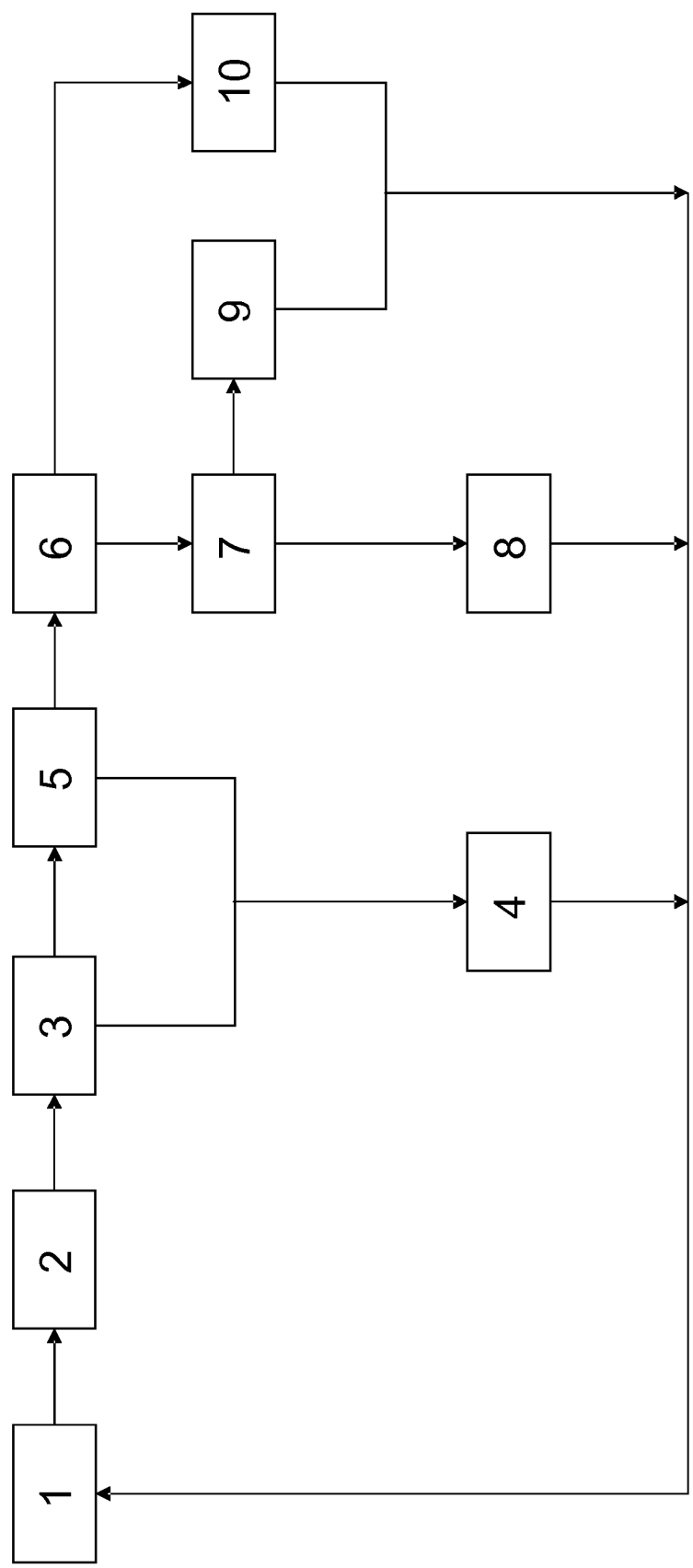

METHOD FOR OPERATING A HYDRAULIC BRAKE SYSTEM

CROSS-REFERENCE TO RELATED APPLICATION

This application is the U.S. national phase of PCT Application No. PCT/EP2012/076612 filed on Dec. 21, 2012, which claims priority to German Patent Application DE 10 2012 200008.9 filed on Jan. 2, 2012, the disclosures of which are incorporated in their entirety by reference herein.

TECHNICAL FIELD

The present invention relates to a method for operating a hydraulic braking system for motor vehicles, the braking system having at least one electric motor-operated braking pressure generator.

BACKGROUND

The output power of electric motor-operated braking pressure generators, for example mechatronic tandem brake master cylinders or pumps of a driving dynamics control system of the motor vehicle (electronic stability control (ESC) or electronic stability program (ESP) pumps), is generally restricted in driving mode in order to prevent overheating of the electric motor of the motor vehicle. However, this restriction of the electric motor output power in a critical driving situation in relation to the braking effect, e.g. in the case of strong brake fading, leads to a maximum braking pressure in the braking system that is too low and to a pressure build-up in the braking system that is too slow. This results in a lengthening of the braking distance in the case of critical driving situations of the motor vehicle in relation to the braking effect.

SUMMARY

Against this background, the object of the present invention is to provide a method of operating a hydraulic braking system for motor vehicles, which eliminates the above-mentioned disadvantages.

It should be noted that the features individually listed in the following description can be combined with each other in any technically meaningful manner and denote further embodiments of the invention. The description additionally characterizes and specifies the invention, especially in combination with the figures.

In the case of the inventive method for operating a hydraulic braking system for motor vehicles, wherein the braking system comprises at least one electric motor-operated braking pressure generator, especially a mechatronic tandem braking master cylinder or an ESC pump, the output power of the electric motor-operated braking pressure generator is restricted during a normal, non-critical driving situation of the motor vehicle. The restriction is temporarily deactivated as soon as a critical driving situation is detected.

A critical driving situation of the motor vehicle is understood in relation to the present disclosure to be a state of the braking system with reduced braking effect relative to a normal state, such as can occur e.g. as the result of overstressing of the brakes. The consequence of such overstressing appears as fading of the brakes, which generally leads to a reduced braking effect and thus to a longer braking distance of the motor vehicle.

On the one hand, overheating of the electric motor for driving the braking pressure generator during a normal, non-critical driving situation is effectively prevented by means of the reduction of the output power of the electric motor braking pressure generator. On the other hand, however, in the event of a critical driving situation, especially e.g. under strong brake fading, a higher, i.e. maximum, braking pressure and a faster, i.e. the fastest possible, pressure build-up are available to the braking system through the temporary deactivation of the restriction of the electric motor output power of the braking pressure generator. A lengthening of the braking distance in the event of critical driving situations of the motor vehicle with respect to the braking effect can be effectively prevented with the disclosed method.

According to an advantageous embodiment disclosed herein, detection of the critical driving situation involves monitoring the braking pressure, wherein the restriction of the output power of the electric motor-operated braking pressure generator is deactivated if the braking pressure lies above a lower braking pressure threshold value, which can be predetermined, and below an upper braking pressure threshold value, which can be predetermined, and the restriction can be reactivated if the braking pressure lies above the upper braking pressure threshold value or below the lower braking pressure threshold value. In other words, the lower braking pressure threshold value is a value from which a critical driving situation in respect of the braking effect of the braking system is to be expected, and the upper braking pressure threshold value denotes a maximum value of the braking pressure that should not be exceeded for safety reasons in relation to the braking system. Preferably, the lower braking pressure threshold value has a value in the range from approximately 140 bar to approximately 160 bar and the upper braking pressure threshold value has a value in the range from approximately 200 bar to approximately 280 bar.

The reactivation of the restriction on exceeding the upper braking pressure threshold value prevents the braking system from being subjected to an excessive braking pressure, at which it could possibly be subject to damage. The reactivation of the restriction on falling below the lower braking pressure threshold value ensures that the electric motor-operated braking pressure generator cannot overheat during a normal driving situation or during a normal brake application as a result of the reduced output power of the electric drive. Furthermore, it is beneficial to the durability of the electric motor-operated braking pressure generator if it is not operated with the maximum possible output power during the normal brake applications that occur during the preponderance of the time the vehicle is being driven. Thus the lower and upper braking pressure threshold values bound a braking pressure window, in which a critical driving situation in the sense of the invention can exist.

According to a further advantageous embodiment disclosed herein, the braking system also comprises an anti-locking system, wherein the anti-locking system is monitored and the restriction of the output power of the electric motor-operated braking pressure generator is deactivated if the anti-locking system is not carrying out an anti-locking intervention on all the wheels of the motor vehicle. The restriction is reactivated if the anti-locking system is carrying out an anti-locking intervention on all the wheels of the motor vehicle. Because of this, the deactivation of the restriction on the output power of the electric motor-operated braking pressure generator is further limited during a critical driving situation to the time range in which a higher braking pressure in the braking system can also achieve a higher braking effect. As soon as the anti-locking system carries out an anti-locking intervention on all the wheels of the motor vehicle, the braking pressure in the braking system is already so high that a higher braking effect can no longer be achieved through a further rise in the braking pressure in the braking system, the output power of the electric motor-operated braking pressure generator can thus be reduced again as in the normal driving situation.

Another advantageous embodiment disclosed herein provides that the identification of the critical driving situation additionally includes counting of the brake applications by a driver of the motor vehicle and the monitoring of a vehicle speed, wherein the restriction of the output power of the electric motor-operated braking pressure generator is deactivated if the number of brake applications is greater than a brake application threshold that can be predetermined, and the restriction is otherwise reactivated, wherein for the first brake application an initial vehicle speed is determined and the brake applications are only then counted if the vehicle speed lies above a lower speed threshold that can be predetermined and below an upper speed threshold that can be predetermined. This procedure enables the improved determination of a critical driving situation in the sense of the present invention, i.e. in particular a driving situation with reduced braking effect.

According to an advantageous embodiment disclosed herein, the lower speed threshold value lies approximately 5 km/h below the initial vehicle speed determined for the first brake applications and the upper speed threshold value lies approximately 5 km/h above the initial vehicle speed determined for the first brake applications.

Another advantageous embodiment disclosed herein provides that the motor vehicle also comprises a gas pedal and at least one brake light and the position of the gas pedal of the motor vehicle and a braking pressure of the braking system are determined and an activation of the brake light is monitored and priming of the brake is carried out by means of the braking pressure generator as soon as a rapid, in particular sudden, release of the gas pedal is detected, and the priming of the brake is terminated as soon as the braking pressure exceeds approximately 1.5 bar or the brake light is activated. Priming of the brake is understood to mean, in the context of the present invention, the application of the brake linings to the respective brake disks, so that the full braking power is available for a subsequent brake application without significant delay. This is also known as pre-pressurizing or precharging the brakes. In this way, the build-up of pressure in the braking system in the event of brake application is significantly accelerated.

According to an advantageous embodiment disclosed herein, the braking system comprises a tandem braking master cylinder and at least one ESC pump as a braking pressure generator, wherein the priming of the brake is carried out using only the ESC pump. In this manner the use of brake fluid from the tandem braking master cylinder during priming of the brake, and thus a fall in the brake fluid level in the tandem braking master cylinder, are avoided. Thus in the event of a subsequent application of the brake by a driver of the motor vehicle, the full brake operation movement of the tandem braking master cylinder is available to build up the maximum braking pressure in the braking system.

Other advantageous details and effects of the invention are explained in detail below using an exemplary embodiment illustrated in the single figure. It shows:

BRIEF DESCRIPTION OF THE DRAWINGS

FIG. 1 is a flow diagram of an example of a method for operating a hydraulic braking system according to the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components.

Therefore, specific structural and functional details disclosed herein are not to be interpreted as limiting, but merely as a representative basis for teaching one skilled in the art to variously employ the present invention.

FIG. 1 shows a flow diagram of an example of a method for operating a hydraulic braking system of a motor vehicle according to the invention. The method is implemented on a vehicle which is not illustrated in detail in FIG. 1, which comprises a gas pedal for accelerating the motor vehicle and at least one brake light, with which the operation of the brakes of the motor vehicle is indicated in a conventional manner. Furthermore, the braking system of the motor vehicle, which is also not illustrated in detail in FIG. 1, comprises an electric motor operated, mechatronic tandem braking master cylinder and at least one electric motor operated pump of a driving dynamics control system of the motor vehicle, especially an electric motor operated electronic stability control (ESC) pump. Both the tandem braking master cylinder and the at least one ESC pump represent braking pressure generators for generating a braking pressure in the braking system. Moreover, the braking system of the motor vehicle comprises a conventional, commercially available anti-locking system, which effectively prevents locking of the wheels in the event of application of the brakes by a driver of the motor vehicle.

Starting from the starting point 1, the example of the method according to the invention illustrated in FIG. 1 carries out a priming (also known as pre-pressurization or precharge) of the brakes in Step 2 as soon as a rapid, in particular sudden, release of the gas pedal of the motor vehicle is detected. During the brake priming operation the brake linings of the braking system are applied to the respective brake disks, in order to be able to provide the full braking power without significant delay in the event of a subsequent application of the brakes. For the example of the method illustrated in FIG. 1, the brake priming operation is not carried out by the tandem braking master cylinder, but in an advantageous manner by the ESC pump. Thus an unwanted lowering of the level of the brake fluid in the tandem braking master cylinder as a result of the piston movements that would otherwise be necessary for the brake priming operation is effectively avoided. Thus, in the event of a subsequent application of the brakes by a driver of the motor vehicle, the full brake operation displacement of the tandem braking master cylinder is available for the build-up of a maximum braking pressure in the braking system. In this way, the build-up of pressure in the braking system is accelerated.

The brake priming operation by the ESC pump is terminated as soon as the braking pressure in the braking system exceeds approximately 1.5 bar or the brake light is activated. The method illustrated in FIG. 1 then continues with Step 3, in which it is checked whether the braking pressure P of the tandem braking master cylinder exceeds a predefined lower braking pressure threshold value P_th_low or not.

The lower braking pressure threshold value P th_low for the method illustrated in FIG. 1 preferably lies in a range from approximately 140 bar to approximately 160 bar and approximately denotes the pressure range of the braking system, from which the braking system can expect an intervention by the anti-locking system. Thus the lower braking pressure threshold value represents a value above which a critical driving situation of the vehicle in relation to the braking effect can be anticipated.

If it is determined in Step 3 that the braking pressure P of the tandem braking master cylinder is less than or equal to the lower braking pressure threshold value P_th_low, the method illustrated in FIG. 1 continues with Step 4, in which a normal brake operation for a normal, non-critical driving situation is carried out. This means that the output power of the electric motor-operated braking pressure generator of the braking system, i.e. the tandem braking master cylinder and ESC pump, is restricted for the normal driving situation, in order e.g. to effectively prevent overloading or overheating of the electric motor or motors for driving the braking pressure generator. In other words, in Step 4, a brake operation with restricted output power of the electric motor-operated braking pressure generator is ensured.

If it is determined in Step 3 that the braking pressure P of the tandem braking master cylinder exceeds the lower braking pressure threshold value P_th_low, the method illustrated in FIG. 1 continues with Step 5, in which the number of brake applications n_b by the driver of the motor vehicle at a defined vehicle speed V is now additionally counted.

The exemplary embodiment illustrated in FIG. 1 determines a vehicle speed V_ini at the first brake application in Step 5. Whilst the vehicle speed V exceeds a predefined lower speed threshold V_ini_th_low and is less than a predefined upper speed threshold V_ini_th_high, the brake applications n_b by the driver of the motor vehicle are counted. In order to be able to clearly identify a critical driving situation, especially a driving situation with reduced braking effect, the lower speed threshold V_ini_th_low and the upper speed threshold V_ini_th_high were determined for the exemplary embodiment illustrated in FIG. 1 in such a manner that the lower speed threshold V_ini_th_low is approximately 5 km/h below the initial vehicle speed V_ini determined for the first brake applications and the upper speed threshold V_ini_th_ high is approximately 5 km/h above the initial vehicle speed V_ini determined for the first brake applications. In other words, the difference V_ini−V_ini_th_low and the difference V_ini_th_high−V_ini are approx. 5 km/h.

If in Step 5 the number n_b of brake applications determined is less than or equal to a predefined brake application threshold value n_b_th, the exemplary embodiment illustrated in FIG. 1 continues with Step 4, in which a brake operation with restricted output power of the electric motor-operated braking pressure generator is ensured, because the vehicle is in a normal, non-critical driving situation with respect to the braking effect.

However, if in Step 5 it is determined that the number of brake applications n_b exceeds the brake application threshold value n_b_th, the exemplary embodiment illustrated in FIG. 1 continues with Step 6. If the number of brake applications n_b exceeds the brake application threshold value n_b_th, this means that for the exemplary embodiment illustrated in FIG. 1, a critical driving situation of the motor vehicle exists, especially with respect to a restricted braking effect, because the speed V of the motor vehicle since the first brake application always remains in the range between the upper speed threshold V_ini_th_high and the lower speed threshold V_ini_th_low. This means that despite multiple brake applications by the driver, the vehicle speed could hardly be reduced. This indicates the existence of brake fading and thus a critical driving situation with respect to the braking effect.

In Step 6, it is determined whether the anti-locking system of the braking system is carrying out anti-locking interventions on the wheels of the motor vehicle. While the anti-locking system is not carrying out an anti-locking intervention on all the wheels of the motor vehicle, the exemplary embodiment illustrated in FIG. 1 continues with Step 7, in which it is determined whether the braking pressure P of the tandem braking master cylinder lies above a predefined upper braking pressure threshold value P_th_high.

The upper braking pressure threshold value P_th_high denotes a maximum pressure value, which the braking pressure in the braking system should attain. In the case of the exemplary embodiment illustrated in FIG. 1, the upper braking pressure threshold value P_th_high has a value in the range of approximately 200 bar to approximately 280 bar. A braking pressure above this range is prevented by the method according to the disclosed embodiment, in order to protect the braking system against possible damage as a result of an excessive braking pressure.

If it is determined in Step 7 that the braking pressure P of the tandem braking master cylinder is not in excess of the upper braking pressure threshold value P_th_high, the exemplary embodiment illustrated in FIG. 1 continues with Step 8.

In Step 8 the restriction on the output power of the electric motor-operated braking pressure generator, i.e. of the tandem braking master cylinder and of the ESC pump or pumps of the braking system, is deactivated. These braking pressure generators then have available the maximum output power of the electric motor driving them, so that they can generate a higher braking pressure and a faster pressure build-up in the braking system. Despite a critical driving situation of the motor vehicle with respect to the braking effect, for example as a result of fading, a lengthening of the braking distance is effectively counteracted as a result of the enhanced braking pressure and the faster pressure build-up.

If it is determined in Step 7 that the braking pressure P of the tandem braking master cylinder lies above the upper braking pressure threshold value P_th_high, the method illustrated in FIG. 1 continues with Step 9, in which the restriction of the output power of the electric motor-operated braking pressure generator is reactivated. It is thereby ensured that the braking pressure P in the braking system generated by the braking pressure generator reduces again to below the upper braking pressure threshold value P_th_high and the braking system is protected against damage.

If it is determined in Step 6 that the anti-locking system of the braking system is carrying out anti-locking interventions on all wheels of the motor vehicle, the exemplary embodiment illustrated in FIG. 1 continues with Step 10, in which it is ensured that the restriction on the output power of the electric motor-operated braking pressure generator is reactivated or maintained. Because the anti-locking system is already carrying out anti-locking interventions on all wheels of the motor vehicle, a higher braking pressure through a possible preceding deactivation of the restriction on the output power of the electric motor-operated braking pressure generator can be dispensed with, so that the output power for the electric motor-operated braking pressure generator is only increased to the maximum value for as short a time as necessary. This procedure is beneficial to the durability and operating life of the electric motor-operated braking pressure generator.

Following Steps 4, 8, 9 and 10, the method illustrated in FIG. 1 returns back to the initial or starting point 1.

The above-described method according to the invention for operating a hydraulic braking system is not limited to the exemplary embodiment disclosed herein, but also includes further embodiments that act in the same way.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SYMBOLS 1 starting point
2 brake priming operation
3 comparison of the braking pressure with a lower threshold value
4 brake application with restricted output power of the braking pressure generator
5 comparison of the number of brake applications with a threshold value
6 determining the state of the anti-locking system
7 comparing the braking pressure with an upper threshold value
8 deactivating the restriction of the output power of the braking pressure generator
9 reactivating the restriction of the output power of the braking pressure generator
10 reactivating or maintaining the restriction of the output power of the braking pressure generator

The invention claimed is:

1. A method for operating a motor vehicle hydraulic braking system having at least one electric motor-operated braking pressure generator, comprising:
   restricting an output power of the braking pressure generator during a non-critical driving situation;
   deactivating the restriction if a braking pressure is above a minimum value and below a maximum value; and
   reactivating the restriction if the braking pressure subsequently rises above the maximum value or drops below the minimum value.

2. The method of claim 1, wherein the braking pressure minimum value has a value in a range from approximately 140 bar to approximately 160 bar and the braking pressure maximum value has a value in a range from approximately 200 bar to approximately 280 bar.

3. The method of claim 1, wherein the braking system further comprises an anti-locking system and the restriction on the output power of the electric motor-operated braking pressure generator is deactivated if the anti-locking system is not carrying out an anti-locking intervention on all wheels of the motor vehicle, and the restriction is reactivated if the anti-locking system is carrying out the anti-locking intervention on all wheels of the motor vehicle.

4. The method of claim 1, further comprising:
   counting brake actuations by a driver of the motor vehicle and monitoring a vehicle speed, and the power output reduction is deactivated only if, in addition to the braking pressure being above the minimum value and below the maximum value, a number of brake actuations exceeds a brake actuation threshold value, wherein upon a first brake actuation an initial vehicle speed is determined and the brake actuations are only then counted if the vehicle speed exceeds a lower speed threshold and lies below an upper speed threshold.

5. The method of claim 4, wherein the lower speed threshold is approximately 5 km/h below the initial vehicle speed and the upper speed threshold is approximately 5 km/h above the initial vehicle speed.

6. The method claim 1, wherein the motor vehicle further comprises a gas pedal and at least one brake light and the braking system further comprises at least one second braking pressure generator, and wherein a brake priming operation is carried out using the second braking pressure generator upon detection of a rapid release of the gas pedal, and the brake priming operation is terminated if a braking pressure of the braking system exceeds approximately 1.5 bar or the brake light is activated.

7. The method of claim 1, wherein the braking pressure generator comprises a tandem braking master cylinder and at least one electronic stability control pump, and a brake priming operation is implemented using only the electronic stability control pump.

8. The method of claim 1, wherein the minimum value is selected based on a pressure at which intervention by an anti-locking brake system is expected, and the maximum value is selected to protect the braking system from damage due to excessive pressure.

9. A method for operating a motor vehicle hydraulic braking system having an electric motor-operated braking pressure generator, comprising:
   restricting an output power of the braking pressure generator during a non-critical driving situation;
   monitoring a braking pressure of the braking system;
   monitoring a vehicle speed;
   counting brake actuations by a vehicle driver; and
   deactivating the restriction if a) the braking pressure is above a minimum value and below a maximum value, and b) a number of brake actuations exceeds an upper threshold number, wherein upon a first brake actuation an initial vehicle speed is determined and the brake actuations are only then counted if the vehicle speed exceeds a lower speed threshold and lies below an upper speed threshold.

10. The method of claim 9, wherein the braking system further comprises an anti-locking system and deactivation of the restriction on the output power of the braking pressure generator further requires that the anti-locking system is not carrying out an anti-locking intervention on all wheels of the motor vehicle.

11. The method of claim 9, wherein the minimum value is selected based on a pressure at which intervention by an anti-locking brake system is expected, and the maximum value is selected to protect the braking system from damage due to excessive pressure.

12. A method for operating a motor vehicle hydraulic braking system having an electric motor-operated braking pressure generator comprising:
   restricting an output power of the braking pressure generator; and
   deactivating the restriction as long as a braking pressure is a) above a minimum value selected based on a pressure at which intervention by an anti-locking brake system is expected, and b) below a maximum value selected to protect the braking system from damage due to excessive pressure.

13. The method of claim 12, wherein the braking system further comprises the anti-locking system and deactivation of the restriction on the output power of the braking pressure generator further requires that the anti-locking system is not carrying out an anti-locking intervention on all wheels of the motor vehicle.

\* \* \* \* \*